United States Patent
Wang et al.

(10) Patent No.: US 8,606,454 B2
(45) Date of Patent: Dec. 10, 2013

(54) SYSTEM AND METHOD FOR SYNCHRONIZED CONTROL OF A HARVESTER AND TRANSPORT VEHICLE

(75) Inventors: Guoping Wang, Naperville, IL (US); Todd Aznavorian, Naperville, IL (US); Arun Natarajan, Naperville, IL (US); Kousha Moaveni Nejad, Chicago, IL (US)

(73) Assignee: CNH America LLC, New Holland, PA (US)

( * ) Notice: Subject to any disclaimer, the term of this patent is extended or adjusted under 35 U.S.C. 154(b) by 106 days.

(21) Appl. No.: 13/171,620

(22) Filed: Jun. 29, 2011

(65) Prior Publication Data
US 2012/0215381 A1   Aug. 23, 2012

Related U.S. Application Data

(60) Provisional application No. 61/444,464, filed on Feb. 18, 2011.

(51) Int. Cl.
*G06F 7/00* (2006.01)
(52) U.S. Cl.
USPC .............. 701/23; 701/41; 701/410; 701/422; 701/423; 180/6.24
(58) Field of Classification Search
USPC ............. 701/23, 41, 410, 422, 423; 180/6.24
See application file for complete search history.

(56) References Cited

U.S. PATENT DOCUMENTS

| | | | |
|---|---|---|---|
| 6,148,255 A | 11/2000 | van der Lely | |
| 6,205,381 B1 | 3/2001 | Motz et al. | |
| 6,216,071 B1 | 4/2001 | Motz | |
| 6,587,772 B2* | 7/2003 | Behnke | 701/50 |
| 6,732,024 B2 | 5/2004 | Wilhelm Rekow et al. | |
| 6,876,920 B1 | 4/2005 | Mailer | |
| 7,155,888 B2 | 1/2007 | Diekhans | |
| 7,277,784 B2* | 10/2007 | Weiss | 701/50 |
| 7,537,519 B2 | 5/2009 | Huster et al. | |
| 2008/0103694 A1* | 5/2008 | Dix et al. | 701/213 |
| 2009/0018717 A1 | 1/2009 | Reed et al. | |
| 2009/0099775 A1* | 4/2009 | Mott et al. | 701/300 |
| 2009/0222160 A1 | 9/2009 | Morselli et al. | |
| 2009/0265107 A1 | 10/2009 | Matsuno | |
| 2009/0306835 A1 | 12/2009 | Ellermann et al. | |

FOREIGN PATENT DOCUMENTS

| | | | |
|---|---|---|---|
| CA | 2305606 | * | 10/2000 |
| DE | 102008021785 A1 | | 11/2009 |

\* cited by examiner

*Primary Examiner* — Mary Cheung
*Assistant Examiner* — Brian P Sweeney
(74) *Attorney, Agent, or Firm* — Patrick M. Sheldrake

(57) ABSTRACT

A control system and method is provided for synchronized control of a harvester and transport vehicle during unload on the go operation. The control system can maintain a desired lateral distance between the harvester and transport vehicle using swath information that is used to steer the harvester. In addition, the control system can also bring a transport vehicle into appropriate alignment with the harvester using the same swath information.

19 Claims, 11 Drawing Sheets

SYSTEM AND METHOD FOR SYNCHRONIZED CONTROL OF A HARVESTER AND TRANSPORT VEHICLE

CROSS-REFERENCE TO RELATED APPLICATIONS

This application claims the benefit of U.S. Provisional Application No. 61/444,464, entitled "SYSTEM AND METHOD FOR SYNCHRONIZED CONTROL OF A HARVESTER AND TRANSPORT VEHICLE," filed Feb. 18, 2011, which application is hereby incorporated by reference in its entirety.

BACKGROUND

The present application relates generally to a system and method for automating or synchronizing the control of a harvester and transport vehicle engaging in "unload on the go" operation. The present application relates more specifically to a control system and method to control the lateral position and the longitudinal position of the transport vehicle relative to the harvester during "unload on the go" operation.

Harvesters or harvesting machines pick up crop material, treat the crop material, e.g., remove any undesirable portions or residue, and discharge the crop material. Harvesters can discharge the crop material, either continuously as with a forage harvester or after intermediate storage as with a combine harvester, to a transport or transfer vehicle. The transport vehicle may be a tractor or truck pulling a cart, wagon, or trailer, or a truck or other vehicle capable of transporting harvested crop material. The harvested crop material is loaded into the transport vehicle via a crop discharging or unloading device, such as a spout or discharge auger, associated with the harvester.

During "unload on the go" operation of the harvester, the harvested crop material is transferred from the harvester to the transport vehicle while both vehicles are moving. The transport vehicle can travel next to and/or behind the harvester during unload on the go operation. Unload on the go operation is required for a forage harvester, since the forage harvester constantly discharges the harvested crop material. While unload on the go operation is not required for a combine harvester due to the combine harvester's intermediate storage capability, unload on the go operation is commonly used for a combine harvester to maximize the operating efficiency of the combine harvester.

To effectively implement unload on the go operation, the operation of the harvester and transport vehicle is coordinated to maintain the relative distance between the harvester and transport vehicle within an acceptable range. By maintaining the relative distance of the harvester and transport vehicle within an acceptable range, the position and orientation of the harvester unload spout and the position of the transport vehicle, specifically the portion of the transport vehicle receiving crop material, relative to the harvester unload spout position are maintained within an acceptable distance range to permit harvester unload on the go operation, i.e., the discharged crop material can be provided into the transport vehicle without loss to the ground. That is, discharged crop material is directed to collect in the transport vehicle and is substantially prevented from being misdirected to miss the transport vehicle and collecting on the ground resulting in waste or loss of crop material. In order to maintain an acceptable distance range between the harvester and the transport vehicle, both the lateral (side to side) distance and longitudinal (fore and aft) distance between the harvester and transport vehicle have to be maintained within acceptable ranges.

Some control systems used for unload on the go operations can determine the lateral position of the transport vehicle as a function of the harvester position plus a predetermined offset. While this type of control system can be effective when the harvester travels in a straight line, unacceptable lateral distance deviations may occur when the harvester changes position abruptly and the control system cannot adjust the position of the transport vehicle quickly enough to avoid crop material loss. Furthermore, the control system can only provide a destination point for a transport vehicle that is approaching the moving harvester, which can result in inaccurate initial alignment of the harvester and transport vehicle and delays in the unload on the go operation.

Therefore, what is needed is a system and method to control the lateral distance between a harvester and transport vehicle during an unload on the go operation and to assist a transport vehicle in approaching a moving harvester to minimize disruption in the unload on the go operation.

SUMMARY

The present application is directed to a system and method for automated or synchronized control of a harvester and transport vehicle during unload on the go operations.

The present application relates to a method for controlling a transport vehicle to bring the transport vehicle into alignment with a harvester for unload on the go operation. The method includes determining a position for the transport vehicle, determining an active swath for the harvester and calculating an adjusted swath for the transport vehicle based on the active swath for the harvester. The method also includes calculating a trajectory for the transport vehicle to travel from the determined position of the transport vehicle to the adjusted swath. The trajectory includes a straight line component and an arc component. The arc component is tangent to both the straight line component and the adjusted swath. The method further includes controlling the transport vehicle to follow the calculated trajectory with commands from a controller.

The present application further relates to a control system to synchronize control of a harvester and a transport vehicle. The control system includes a harvester control system having a first global positioning system device to determine a position of a harvester, a first controller to control operation of the harvester and a first communication device. The first controller includes a first microprocessor to execute a computer program to determine an active swath for the harvester using the position of the harvester from the first global positioning system device and using information relating to a recorded master swath and a harvester swath width. The control system also includes a transport vehicle control system having a second global positioning system device to determine a position of a transport vehicle, a second controller to control operation of the transport vehicle and a second communication device. The second controller includes a second microprocessor to execute a computer program to determine an adjusted swath for the transport vehicle based on the active swath. The second communication device is configured and positioned to wirelessly exchange information with the first communication device. The second controller calculates a trajectory for the transport vehicle based on the position of the transport vehicle from the second global positioning system device, the determined adjusted swath and the first communication device and the second communication device being in wireless communication range with a computer program executed by the second microprocessor. The second controller transmits a control signal to control the transport vehicle to follow the calculated trajectory with a computer program executed by the second microprocessor.

The present application also relates to a method for controlling a transport vehicle to bring the transport vehicle into alignment with a harvester for unload on the go operation. The method includes determining a position and velocity for the transport vehicle, determining a velocity and active swath for the harvester, and calculating an adjusted swath for the transport vehicle based on the active swath for the harvester. The method also includes calculating a trajectory for the transport vehicle to travel from the transport vehicle's position to the adjusted swath. The trajectory includes a straight line component and an arc component. The arc component is tangent to both the straight line component and the adjusted swath. The method additionally includes providing the calculated trajectory to a controller for the transport vehicle and controlling the transport vehicle to follow the calculated trajectory with commands from the controller.

One advantage of the present application is improved accuracy during an unload on the go operation as a result of automated or synchronized control of the harvester and transport vehicle. The accuracy improvements are derived from the automated or synchronized control ensuring that all the crop material being unloaded is directed into the transport vehicle.

Another advantage of the present application is the ability to permit more farmers to perform unload on the go operations as a result of automated or synchronized control which reduces the level of skill required for the operators of the harvester and the transport vehicle.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

In the present application, a vehicle to vehicle (V2V) operation refers to a harvester unload on the go operation, and a V2V combine and a V2V tractor refer to a harvester and transport vehicle performing the harvester unload on the go operation.

Figure 1:
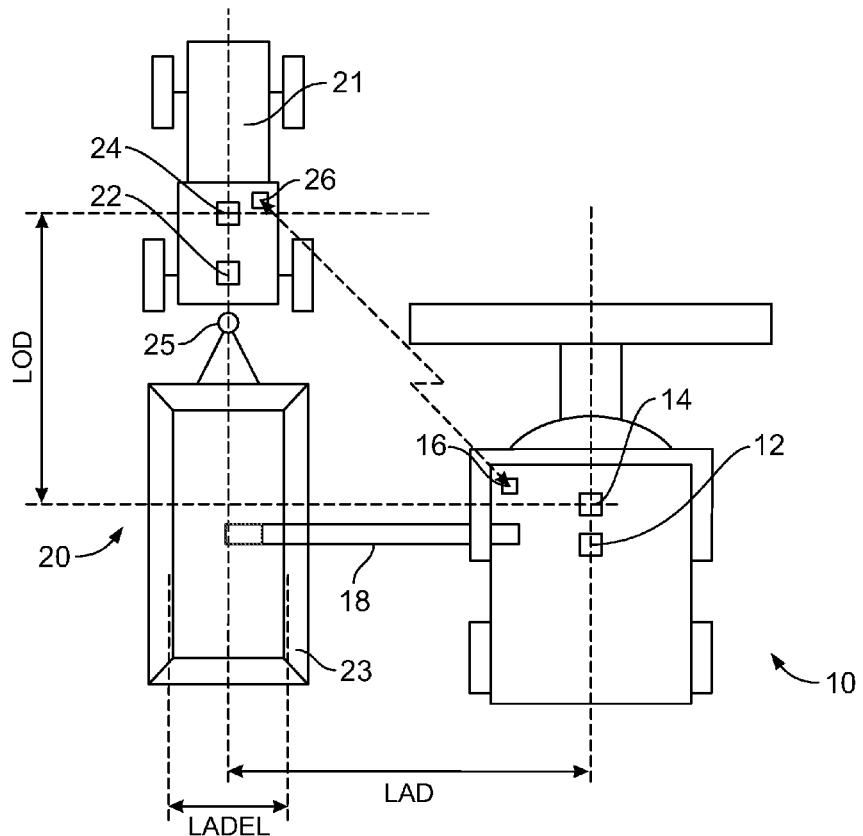
FIG. 1 shows a schematic top view of an embodiment of a harvester and transport vehicle during unload on the go operation.
Figure 2:
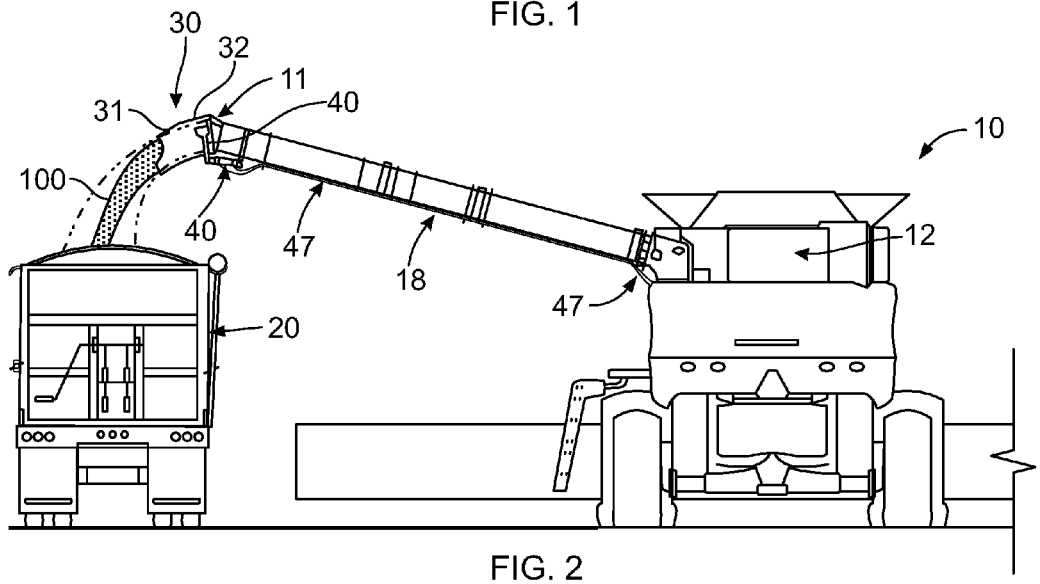
FIG. 2 shows a rear view of an embodiment of a harvester and transport vehicle during unload on the go operation.

FIGS. 1 and 2 show the relative positions of a harvester 10 and transport vehicle 20 during an unload on the go or V2V operation. In one exemplary embodiment, the harvester or V2V combine 10 and the transport vehicle or V2V tractor 20 can be controlled by a global positioning system (GPS) based auto-guidance control system(s) in order to maintain a desired lateral distance (LAD) and a desired longitudinal distance (LOD) between the harvester 10 and the transport vehicle 20. One exemplary embodiment of the reference points used for measuring the desired lateral distance and desired longitudinal distance is shown in FIG. 1. However, any suitable reference points for measuring lateral distance and longitudinal distance can be used. The desired lateral distance and desired longitudinal distance can both be a preselected distances plus or minus a predetermined offset that ensures that crop material discharged from the harvester 10 is received and stored by the transport vehicle 20. As shown in FIG. 1, the lateral distance error limits (LADEL) define the maximum and minimum lateral distances that can be used for unload on the go operation. The preselected lateral and longitudinal distances and the corresponding predetermined offsets can be related to the particular harvesters and transport vehicles being used, specifically the size of the storage area in the transport vehicle and an estimate of the shoot-out distance of the crop material from the harvester unload spout to the transport vehicle.

The harvester 10 can have: a controller 12 that includes a display unit or user interface and a navigation controller; a GPS device 14 that includes an antenna and receiver; and a wireless communication unit or device (WCU) 16 that can include a power control switch. Similarly, the transport vehicle 20 can have: a controller 22 that can include a display unit or user interface, a navigation controller and tractor vehicle to vehicle control unit (TV2V); a GPS device 24 that can include an antenna and receiver; and a wireless communication unit or device (WCU) 26 that can include a power control switch. The controllers can be used to control operation and/or steering of the harvester 10 and/or transport vehicle 20, regardless of the machine in which the controller may be installed. The GPS device can be used to determine the position of the harvester 10 or transport vehicle 20 and the wireless communication device can be used to send and receive information, data and control signals between the harvester 10 and the transport vehicle 20.

In the exemplary embodiment shown in FIG. 1, the transport vehicle 20 can include a fraction device 21 and a loading receptacle 23. A hitch angle sensor 25 can be used to determine the relative angle or hitch angle between the fraction device 21 and the loading receptacle 23. As shown in FIG. 1, the traction device 21 can be a tractor and the loading receptacle 23 can be a wagon. However, in other embodiments, the traction vehicle 21 may be a truck or other self-propelled vehicle sufficient to transport the loading receptacle 23 and the loading receptacle 23 may be a grain cart, bin, or other similar storage/transport vehicle. In another embodiment, the transport vehicle 20 may be a truck, semi-trailer truck, tractor-trailer or other similar self-propelled container vehicle.

Referring now to FIG. 2, the combine harvester 10 has an unloading tube or spout 18 transversely extending and fully deployed as it unloads crop material 100 through the discharge boot 30 and into the transport vehicle 20. The boot 30 can have any convenient and suitable shape. In one exemplary embodiment, the boot 30 can be generally cylindrical, but can be more boxy with edges, or venturi-shaped, etc. The opening of the unloading tube or spout 18 at its distal end is peripherally sealed by a joint member 11 which hingedly engages portion 32 of the boot 30, which portion 32 interfaces the distal end of the unloading tube or spout 18. The joint member 11 can be rounded or spherical, but can also be cylindrical on a horizontal axis, as long as the interface between the tube or spout 18 and boot 30 is adequately sealed. Angularly extending from portion 32 of the boot 30 is a spout end 31 of the boot 30. Signals from the controller 12 of the combine harvester 10, travel through conduits 47 for controlling actuators 40, which actuators 40 can pivotally move the boot 30 up and down and back and forth in hinging relationship to the unloading tube or spout 18, via a spherical joint 11. The joint 11 also serves to seal the interface at the end 32 of the boot 30.

The controllers 12, 22 can include a microprocessor, a non-volatile memory, an interface board, an analog to digital (A/D) converter, and a digital to analog (D/A) converter to control operation of the harvester and/or transport vehicle. The controllers 12, 22 can execute one or more control algorithms to control operation, guidance and/or steering of the harvester 10 and/or transport vehicle 20 and to implement harvester spout control. In one embodiment, the control algorithm(s) can be computer programs or software stored in the non-volatile memory of the controllers 12, 22 and can include a series of instructions executable by the corresponding microprocessor of the controllers 12, 22. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the controllers 12, 22 can be changed to incorporate the necessary components and to remove any components that may no longer be required.

Further, the controllers 12, 22 can be connected to or incorporate a display unit or user interface that permits an operator of the harvester 10 or transport vehicle 20 to interact with the controllers 12, 22. The operator can select and enter commands for the controllers 12, 22 through the display unit or user interface. In addition, the display unit or user interface can display messages and information from the controllers 12, 22 regarding the operational status of the harvester 10 and/or transport vehicle 20. The display units or user interfaces can be located locally to the controllers 12, 22, or alternatively, the display units or user interfaces can be located remotely from the controllers 12, 22. In another exemplary embodiment, the controllers 12, 22 can each include one or more subcontrollers under the control of a master controller. Each subcontroller and the master controller can be configured similar to the controllers 12, 22.

In one exemplary embodiment, the controllers 12, 22 can execute a V2V autoguidance control system that can automatically steer a V2V tractor to follow the travel path of a V2V combine during harvester unload on the go operations. The autoguidance control system can steer the V2V tractor in a controlled manner during harvester unload on the go operations to maintain the lateral distance between the V2V tractor and the V2V combine within the specified lateral distance error limits. In order to steer the V2V tractor, the autoguidance control system can provide control signals to a steering control valve to adjust the steering position of the V2V tractor (and ultimately the path of the V2V tractor) and receive signals from a steering sensor to determine the current steering position of the V2V tractor.

Figure 3:
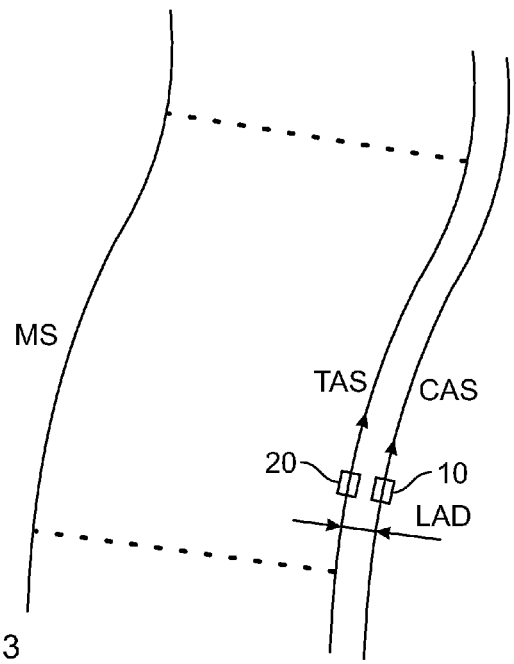
FIG. 3 shows an embodiment of a master swath, combine active swath and tractor adjusted swath used with a V2V autoguidance control system.

The V2V autoguidance control system can also be used to automatically steer the V2V combine based on predetermined swaths in a field or area where the harvester unload on the go operation is occurring. FIG. 3 shows a master swath, combine active swath and tractor adjusted swath of a field. A recorded master swath (MS) of a certain pattern, a straight line or a curve, i.e., any suitable autoguidance swath pattern type, is stored in a nonvolatile memory inside the controller 12. The master swath can be recorded in terms of GPS coordinates of swath waypoints. In one exemplary embodiment, the same master swath can be used as a baseline for autoguidance operations in both crop planting and harvesting.

When the V2V combine is operating, the display unit of the controller 12 generates several swaths around the current V2V combine location that are parallel to the master swath. The distance between two adjacent parallel swaths can be equal to the combine swath width, or cutting width, starting from the master swath. When a V2V operation is activated, the parallel swath nearest to the combine location is selected as the combine active swath (CAS).

In one exemplary embodiment, the V2V autoguidance control system can use combine auto-steering or combine autoguidance to steer the V2V combine on the combine active swath during unload on the go operations. Manual steering of the V2V combine by the operator can be permitted on a temporary basis during unload on the go operation as long as the V2V combine position does not deviate from the combine active swath by a distance that would result in the lateral distance between the V2V combine and the V2V tractor being outside of the lateral distance error limits.

The WCUs on the V2V combine and V2V tractor provide wireless communications between the two vehicles. The V2V combine controller can wirelessly send data on the combine active swath and combine heading to the V2V tractor to inform and notify the V2V tractor of the V2V combine's current travel path. The V2V tractor controller can receive data on the combine active swath, and generate a tractor adjusted swath (TAS) which is parallel to and offset from the combine active swath by the required lateral distance or lateral offset parameter. The V2V tractor navigation controller then controls the automated steering of the V2V tractor to follow the tractor adjusted swath and, therefore, maintain a required lateral distance between the V2V combine and V2V tractor.

Figure 4A:
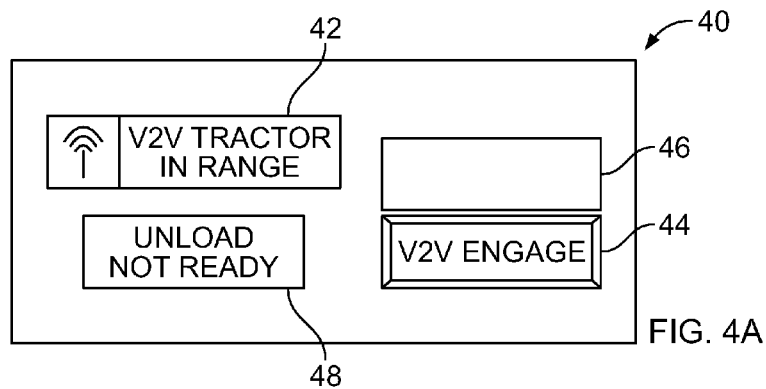
FIGS. 4A and 4B show schematically embodiments of display screens for a harvester and a transport vehicle associated with a V2V autoguidance control system.
Figure 4B:
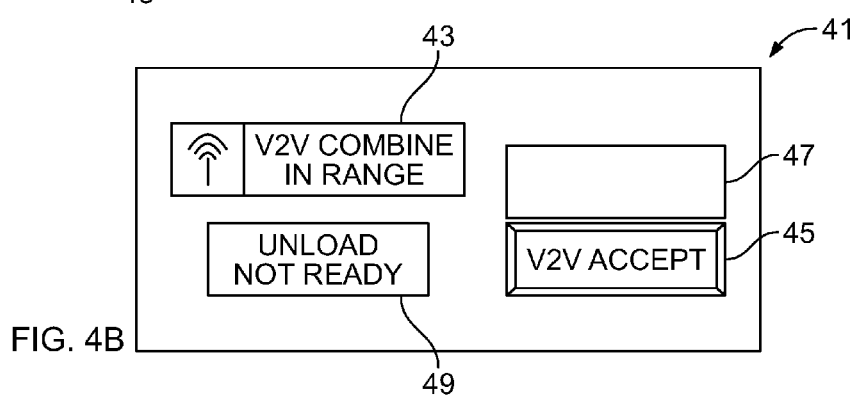

FIGS. 4A and 4B show exemplary embodiments of user interface touch screens for the V2V combine and the V2V tractor. The user interface touch screens can be part of the corresponding display unit for the V2V combine and the V2V tractor. FIG. 4A shows a V2V combine user interface 40. The V2V combine user interface 40 can include a wireless communication icon (the antenna symbol) and an associated text message box 42, a multi-function V2V control button 44, an associated text message box 46 for the multi-function V2V control button, and an unload condition text message box 48. The wireless communication icon and associated message box 42 alert the vehicle operator about wireless communication status. The unload condition text message box 48 can display a "Ready to Unload" message with a green background or an "Unload Not Ready" message with a grey or red background. In addition to the V2V combine user interface

40, the controller can include a buzzer (not shown) to provide audible signals to the operator.

FIG. 4B shows a V2V tractor user interface 41. The V2V tractor user interface 41 can include a wireless communication icon (the antenna symbol) and an associated text message box 43, a multi-function V2V control button 45, an associated text message box 47 for the multi-function V2V control button, and an unload condition text message box 49. The wireless communication icon and associated message box 43 alert the vehicle operator about wireless communication status. The unload condition text message box 49 can display a "Ready to Unload" message with a green background or an "Unload Not Ready" message with a grey or red background. In addition to the V2V combine user interface 41, the controller can include a buzzer (not shown) to provide audible signals to the operator.

Figure 5A:
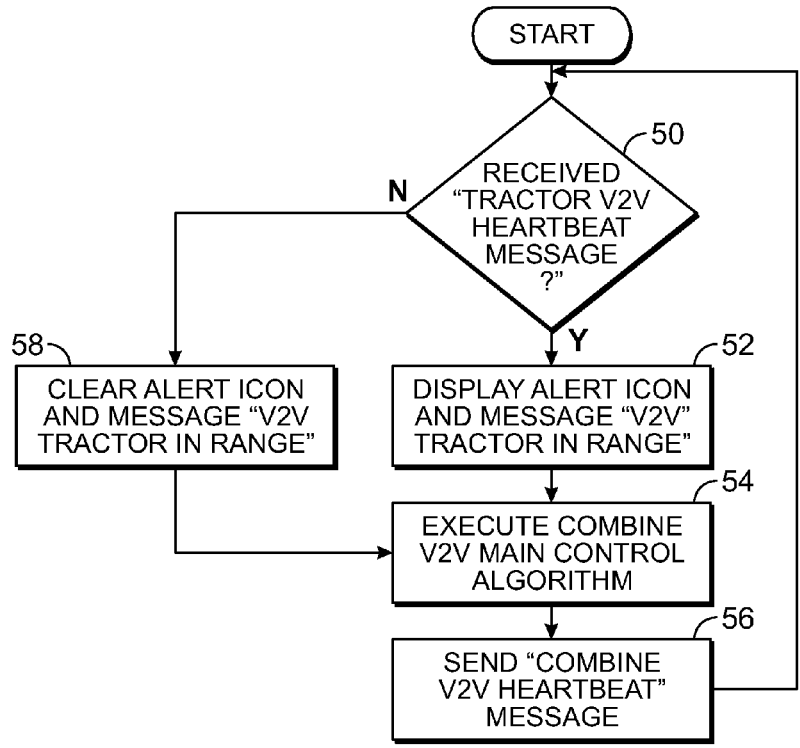
FIGS. 5A and 5B show flow charts of embodiments of control processes implemented by the harvester and transport vehicle for a V2V autoguidance control system.
Figure 5B:
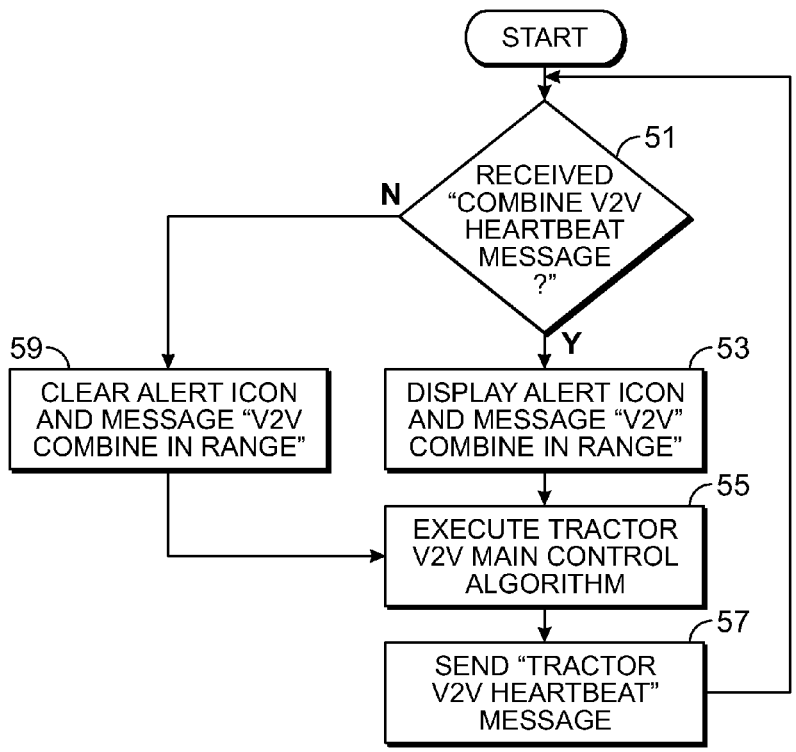

FIGS. 5A and 5B show flow charts for the V2V autoguidance control system as implemented by the V2V combine and the V2V tractor. The flow charts are executed once in every time step, such as a time step of 0.2 second or other time values. FIG. 5A shows the flow chart for the V2V autoguidance system as implemented by the V2V combine. At each time step, the process begins with the V2V combine controller checking for the tractor V2V heartbeat message (step 50). If the V2V combine controller receives the tractor V2V heartbeat message through wireless communication, which message indicates that it is possible to engage V2V operation, the V2V combine controller displays a "V2V Tractor in Range" message in box 42 of the V2V combine user interface 40 (step 52), and then executes the combine V2V main control algorithm (step 54). However, if the V2V combine controller does not receive the tractor V2V heartbeat message or there is no wireless communication between the V2V combine and V2V tractor, the V2V combine controller clears the "V2V Tractor in Range" message in box 42 of the V2V combine user interface 40 (step 58), and then executes the combine V2V main control algorithm (step 54). At the end of the process in each time step, the V2V combine controller sends a combine V2V heartbeat message (step 56) which is transmitted by the combine wireless communication unit (WCU) 16, and waits for the next time step to return to the beginning of the process (step 50).

FIG. 5B shows the flow chart for the V2V autoguidance system as implemented by the V2V tractor. At each time step, the process begins with the V2V tractor controller checking for the combine V2V heartbeat message (step 51). If the V2V tractor controller receives the combine V2V heartbeat message through wireless communication, which message indicates that it is possible to engage V2V operation, the V2V tractor controller displays a "V2V Combine in Range" message in box 43 of the V2V tractor user interface 41 (step 53), and then executes the tractor V2V main control algorithm (step 55). However, if the V2V tractor controller does not receive the combine V2V heartbeat message or there is no wireless communication between the V2V tractor and V2V combine, the V2V tractor controller clears the "V2V Combine in Range" message in box 43 of the V2V tractor user interface 41 (step 59), and then executes the tractor V2V main control algorithm (step 55). At the end of the process in each time step, the V2V tractor controller sends a tractor V2V heartbeat message (step 57) which is transmitted by the tractor wireless communication unit (WCU) 26, and waits for the next time step to return to the beginning of the process (step 51).

Figures 6A, 6B:
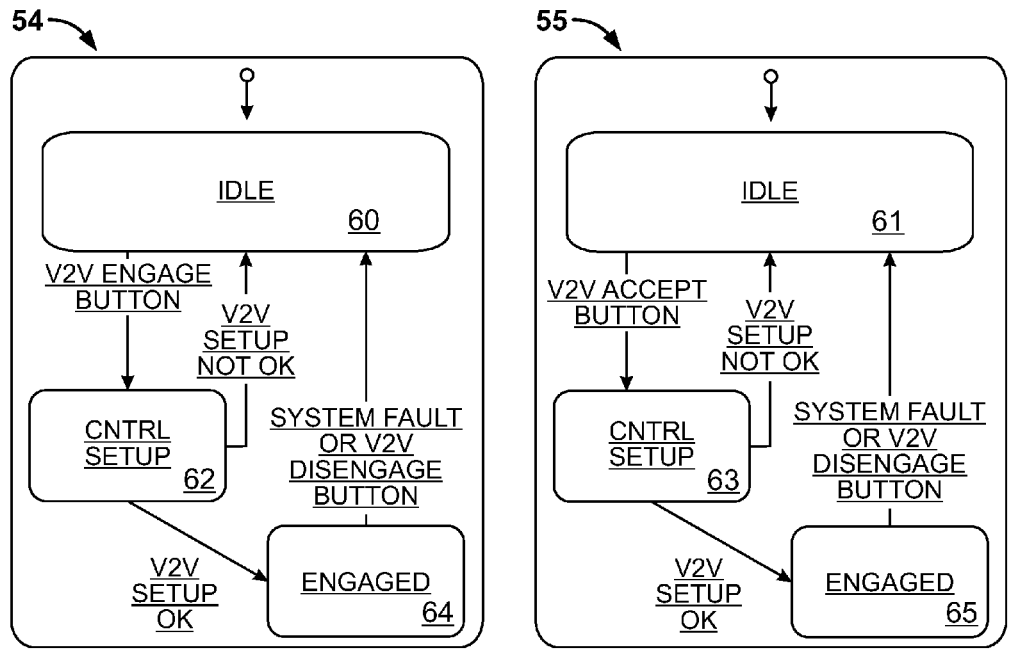
FIGS. 6A and 6B show schematically embodiments of control systems for the main control algorithms from FIGS. 5A and 5B.

FIGS. 6A and 6B show embodiments of the control systems for the combine V2V main control algorithm and the tractor V2V main control algorithm. FIG. 6A shows a control system or controller for V2V control operation in the V2V combine. The control system for V2V control operation in the V2V combine begins in an idle state 60. If the V2V control button 44 is enabled depending on V2V preconditions, which include tractor V2V heartbeat message and GPS signal quality, and the operator selects the "V2V Engage" command from V2V control button 44, the control system then enters a control setup state 62. If the control setup state 62 determines that V2V operation can occur, then the control system transitions to the engaged state 64 and V2V operation begins. However, if the control setup state 62 determines that V2V operation cannot occur, then the control system transitions back to the idle state 60. Further, once the control system is in the engaged state 64, the control system can return to the idle state 60 in response to the occurrence of a system fault or the selection of the "V2V Disengage" command from the V2V control button 44 by the operator.

FIG. 6B shows a control system or controller for V2V control operation in the V2V tractor. The control system for V2V control operation in the V2V tractor begins in an idle state 61. If the operator selects the "V2V Accept" command from V2V control button 45, the control system then enters a control setup state 63. If the control setup state 63 determines that V2V operation can occur, then the control system transitions to the engaged state 65 and V2V operation begins. However, if the control setup state 63 determines that V2V operation cannot occur, then the control system transitions back to the idle state 61. Further, once the control system is in the engaged state 65, the control system can return to the idle state 61 in response to the occurrence of a system fault or the selection of the "V2V Disengage" command from the V2V control button 45 by the operator.

Figure 7:
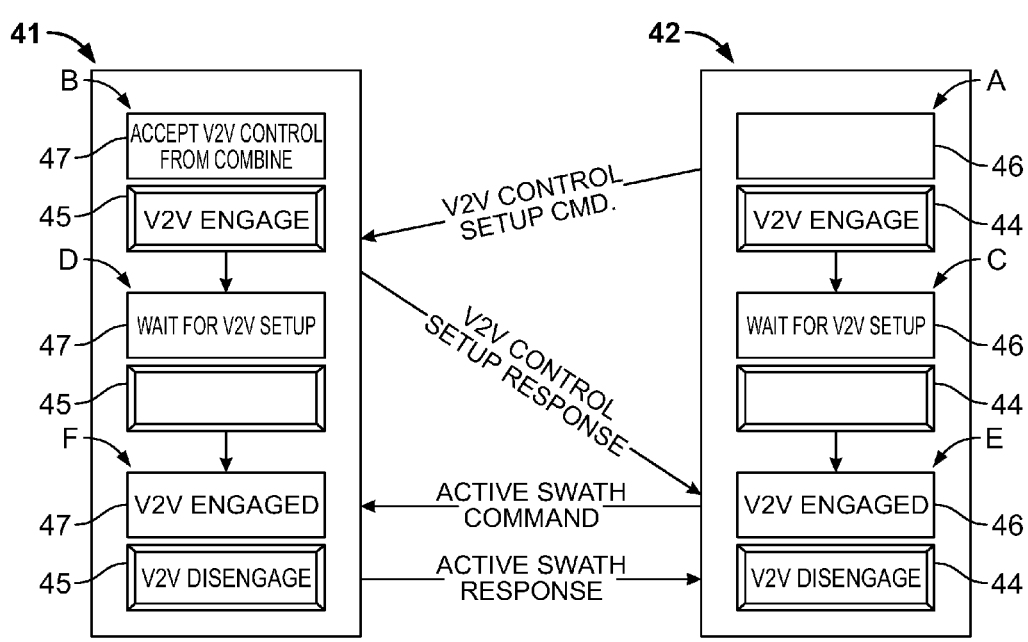
FIG. 7 shows different variations of the display screens from the harvester and the transport vehicle when initiating V2V autoguidance control.

FIG. 7 shows different functions for the V2V control buttons 44, 45 with associated text messages in message boxes 46, 47 for different control events or states during the engagement of V2V operation. The engagement of V2V operation begins at A with the V2V control button 44 displaying "V2V Engage." If the "V2V Engage" command is selected by the combine operator, a V2V control setup command is sent from the V2V combine to the V2V tractor. When the V2V control setup command is received, the operation proceeds to B with message box 47 displaying "Accept V2V control from combine?" and the V2V control button 45 displaying "V2V Accept." In addition, when the V2V control setup command is sent, the operation also proceeds to C with message box 46 displaying "Wait for V2V setup." If the "V2V Accept" command is selected by the tractor operator, a V2V control setup response is sent from the V2V tractor to the V2V combine.

In one exemplary embodiment, the V2V control setup command message can include the following information: master swath, swath type, active swath, swath width, combine header offset, and unload tube or spout position offset. The V2V control setup response message is an acknowledgement from the V2V tractor in response to a V2V control setup command. If a V2V control setup is successful by the V2V tractor, a positive acknowledgement along with data on the actual V2V control setup for the V2V tractor is sent. If a V2V control setup is not successful, a negative acknowledgement is sent.

When the V2V control setup response is received and the necessary initialization steps have been completed, the V2V combine operation proceeds to E with message box 46 displaying "V2V engaged" and the V2V control button 44 displaying "V2V Disengage." In addition, when the V2V control setup response is sent, the V2V tractor operation proceeds to D with message box 47 displaying "Wait for V2V setup." Once V2V operation has been engaged in the V2V combine, an active swath command can be sent to the V2V tractor and the operation can proceed to F with message box 47 displaying "V2V engaged" and the V2V control button 45 displaying "V2V Disengage." Once V2V operation has been engaged in the V2V tractor, an active swath response can be sent to the V2V combine.

In an exemplary embodiment, the V2V active swath command message can include the following data: active swath, swath trim distance, and swath nudge distance. The V2V active swath command message can be sent once every time step when the V2V control is engaged. The V2V active swath response message is an acknowledgement from the V2V tractor in response to the V2V active swath command message.

In one exemplary embodiment, the V2V control buttons 44, 45 can have multiple functions depending on the V2V machine and the V2V state during operation. In the idle state, the combine V2V control button function can be "V2V Engage" for initiating a V2V control. Once the V2V tractor receives a V2V control setup command from the V2V combine, the tractor V2V control button function can be "V2V Accept" for the V2V tractor operator to accept a V2V control by the V2V combine. In the engaged state, the V2V control button function is changed to "V2V Disengage" for terminating a V2V control. In another exemplary embodiment, in the engaged state, a manual steering operation of the V2V tractor also terminates V2V control.

In an exemplary embodiment, once the V2V combine and V2V tractor are in the engaged state, the "Ready to Unload" alert message is displayed in the message boxes 48, 49 when the required V2V lateral distance and longitudinal distance are both satisfied within the error limits. Otherwise, an "Unload Not Ready" message is displayed in the message boxes 48, 49. For manual control of the V2V combine unload tube swing and unload auger engaging/disengaging, the unload condition messages in the message box 48 provide notice to the combine operator to assist the operator with timing associated with performance of manual operations to prevent loss of crop material. For automated control of combine unload tube swing and/or automated control of unload auger engaging/disengaging, the control signal that generates the unload condition messages can also trigger the automated actions of the unload tube and/or auger. To the V2V tractor operator, the unload condition messages are for information only and no action is taken. In one exemplary embodiment, the combine GPS position message can be sent from the V2V combine to the V2V tractor for calculation of actual lateral distance and longitudinal distance between the V2V combine and V2V tractor.

Figure 8:
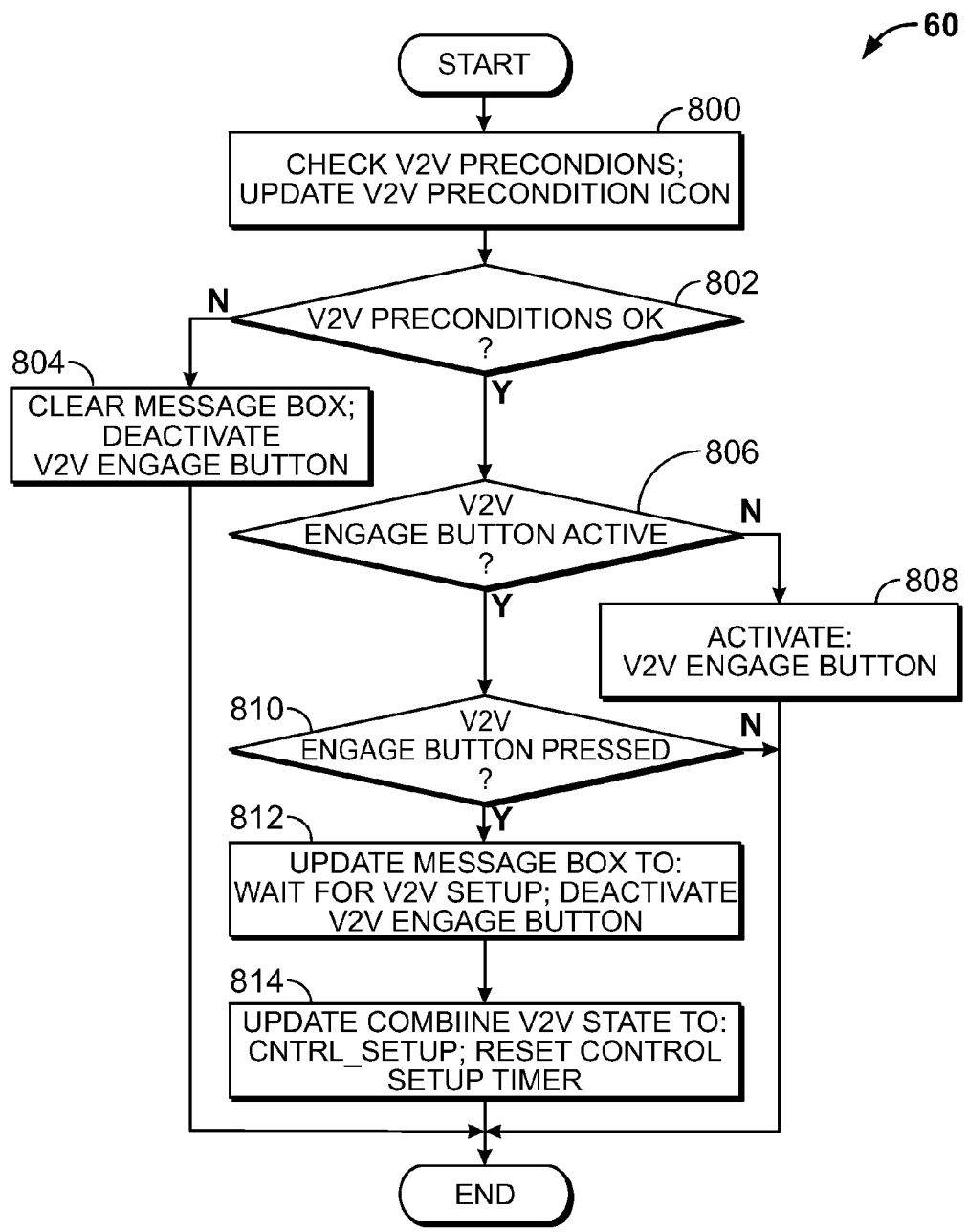
FIGS. 8-10 shows flow charts of embodiments of the control processes for the control system of FIG. 6A.

FIG. 8 shows a control process for the combine idle control state from FIG. 6A. The combine idle control state 60 can receive information on GPS signal quality and the tractor V2V heartbeat message as V2V preconditions, and can enable or disable the V2V control button 44 based on that information or based on the operator control input on the V2V control button 44.

The process for the combine idle control state begins by checking for information on V2V precondition parameters, e.g., GPS signal quality and tractor V2V heartbeat message, to see if the necessary V2V preconditions are satisfied to permit V2V operation, and updating a V2V icon of the V2V combine user interface 40 (step 800). The V2V icon (not shown in FIG. 4A) can be, but is not limited to, a box with a "V2V" text in it and with green background when the necessary V2V preconditions are satisfied, or the V2V icon can be a box with an "X" overlaying the V2V text and with red background when the necessary V2V preconditions are not satisfied. Next, a process decision is made based on if the necessary V2V preconditions are satisfied to permit V2V operation (step 802). If the V2V preconditions are not satisfied, the text message box 46 is cleared and the V2V control button 44 is deactivated (step 804) and the process ends. Alternatively, if the V2V preconditions are satisfied, a determination is made on whether the V2V control button 44 is active and displaying "V2V Engage" (step 806). If the V2V control button 44 is not active, the V2V control button 44 is activated and displays "V2V Engage" (step 808) and the process ends. Alternatively, if the V2V control button 44 is active, a determination is made on whether the V2V control button 44 has been pressed or selected (step 810). If the V2V control button 44 has not been pressed or selected, the process ends. Alternatively, if the V2V control button 44 has been pressed or selected, the text message box 46 is updated to display "Wait for V2V Setup" and the V2V control button 44 displaying "V2V Engage" is deactivated (step 812). Next, the combine control setup control state is initiated and the control setup timer is reset (step 814) and the process ends.

Figure 9:
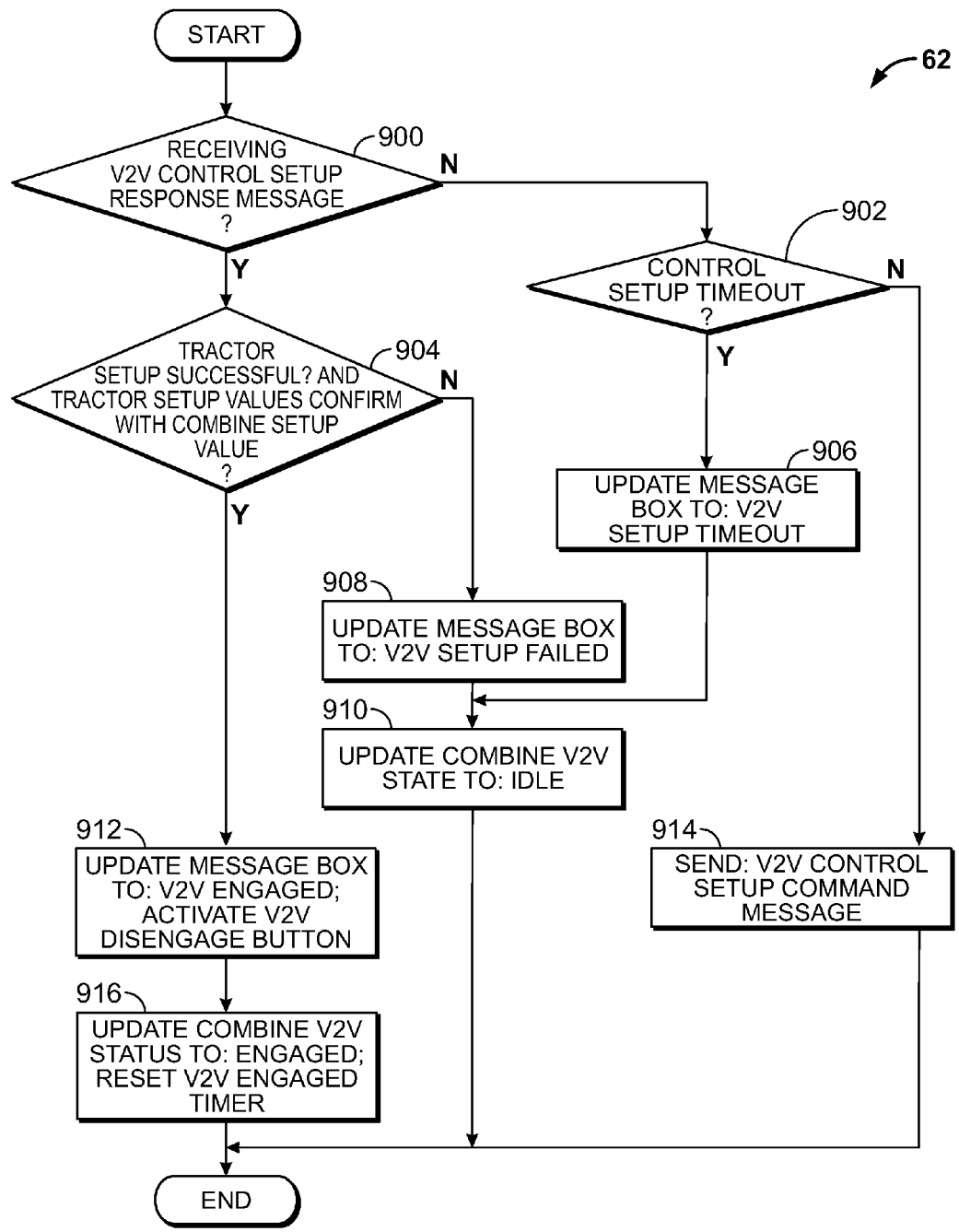

FIG. 9 shows a control process for the combine control setup control state from FIG. 6A. For the combine control setup control state 62, a V2V control setup timer is reset at the end of the combine idle control state 60 and the V2V control setup timeout can be set at a predetermined time value, e.g., 15 seconds.

The process for the combine control setup control state begins by determining whether a V2V control setup response message has been received from the V2V tractor (step 900). If the V2V control setup response message has not been received, a determination is made on whether the V2V control setup timer has expired (step 902). If the V2V control setup timer has not expired, a V2V control setup command message is sent to the V2V tractor (step 914) and the process ends. In one exemplary embodiment, the V2V control setup command message can include one or more of the following: a combine swath unique identifier (SUID) associated with the master swath; swath type; number of points in master swath; a start point or first point for curve of master swath; an end point or second point for curve of master swath; remark distance; minimum turning radius; header width; header offset; unload tube distal end lateral offset from the combine GPS position; and unload tube distal end longitudinal offset from the combine GPS position.

If the V2V control setup timer has expired, the text message box 46 is updated to "V2V setup timeout" (step 906) and the combine idle control state is engaged (step 910) and the process ends. If the V2V control setup response message has been received, a determination is made on whether the V2V tractor setup has been successful and whether the V2V tractor setup values agree with the V2V combine setup values (step 904). If the V2V tractor setup has not been successful and/or the V2V tractor setup values do not agree with the V2V combine setup values, the text message box 46 is updated to "V2V setup failed" (step 908) and the combine idle control state is initiated (step 910) and the process ends. Alternatively, if the V2V tractor setup has been successful and the V2V tractor setup values agree with the V2V combine setup values, the text message box 46 is updated to display "V2V engaged" and the V2V control button 44 is activated and displays "V2V Disengage" (step 912). Next, the combine engaged control state is initiated and the V2V engaged timer is reset (step 916) and the process ends.

Figure 10:
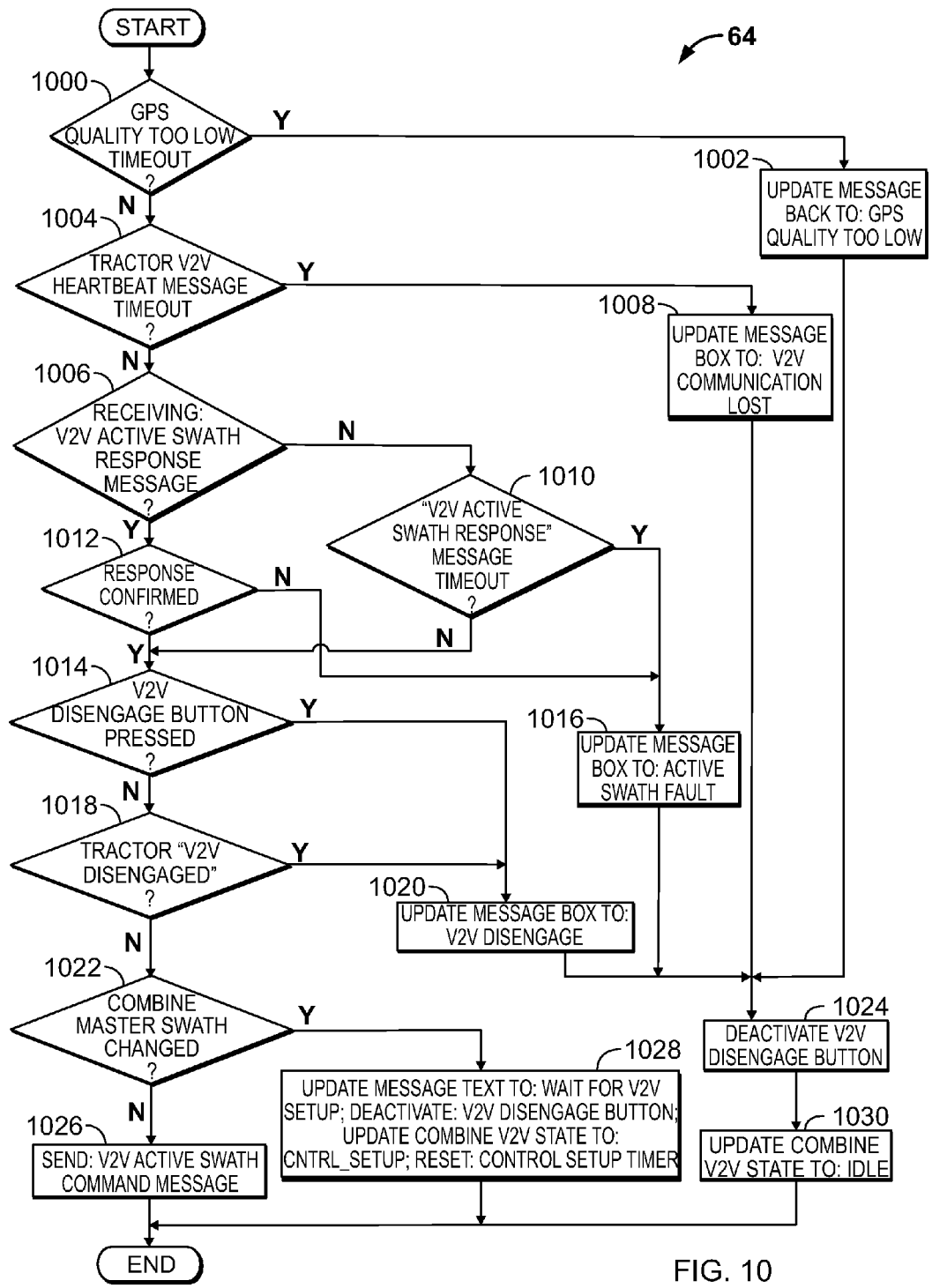

FIG. 10 shows a control process for the combine engaged control state from FIG. 6A. In the combine engaged control state 64, a V2V engaged timer is reset at the end of the combine control setup control state. Additionally, the GPS quality too low timeout, the heartbeat message timeout and the V2V active swath response message timeout can each be set at the same time value as the V2V engaged timer, e.g., 1 second, or they can be individually assigned different time values. In addition, for the combine engaged control state 64, the GPS quality must be at least Omnistar HP/XP (+/−10 cm) or higher for V2V engage.

The process for the combine engaged control state begins by determining whether the GPS quality too low timeout has expired (step 1000). If the GPS quality too low timeout has expired, the text message box 46 is updated to display "GPS quality too low" (step 1002), the V2V control button 44 displaying "V2V Disengage" is deactivated (step 1024) and the combine idle control state is initiated (step 1030) and the process ends. Alternatively, if the GPS quality too low timeout has not expired, a determination is made on whether the Tractor V2V heartbeat message timeout has expired (step 1004). If the Tractor V2V heartbeat message timeout has expired, the text message box 46 is updated to display "V2V communication lost" (step 1008), the V2V control button 44 displaying "V2V Disengage" is deactivated (step 1024) and the combine idle control state is initiated (step 1030) and the process ends. Alternatively, if the Tractor V2V heartbeat message timeout has not expired, a determination is made on whether the V2V active swath response message has been received from the V2V tractor (step 1006).

If the V2V active swath response message has not been received, a determination is made on whether the V2V active swath response message timeout has expired (step 1010). If the V2V active swath response message timeout has expired, the text message box 46 is updated to display "Active swath fault" (step 1016), the V2V control button 44 displaying "V2V Disengage" is deactivated (step 1024) and the combine idle control state is initiated (step 1030) and the process ends. Alternatively, if the V2V active swath response message timeout has not expired, a determination is made on whether the V2V control button 44 displaying "V2V Disengage" has been pressed or selected (step 1014).

If the V2V active swath response message has been received, a determination is made on whether the response message has been confirmed by the V2V combine (step 1012). If the response message has not been confirmed, the text message box 46 is updated to display "Active swath fault" (step 1016), the V2V control button 44 displaying "V2V Disengage" is deactivated (step 1024) and the combine idle control state is initiated (step 1030) and the process ends. Alternatively, if the response message has been confirmed, a determination is made on whether the V2V control button 44 displaying "V2V Disengage" has been pressed or selected (step 1014).

If the V2V control button 44 displaying "V2V Disengage" has been pressed or selected, the text message box 46 is updated to display "V2V Disengaged" (step 1020), the V2V control button 44 displaying "V2V Disengage" is deactivated (step 1024) and the combine idle control state is initiated (step 1030) and the process ends. Alternatively, if the V2V control button 44 displaying "V2V Disengage" has not been pressed or selected, a determination is made on whether "V2V Disengage" has been selected at the V2V tractor (step 1018).

If "V2V Disengage" has been selected at the V2V tractor, the text message box 46 is updated to display "V2V Disengaged" (step 1020), the V2V control button 44 displaying "V2V Disengage" is deactivated (step 1024) and the combine idle control state is initiated (step 1030) and the process ends. Alternatively, if "V2V Disengage" has not been selected at the V2V tractor, a determination is made on whether the combine master swath has been changed (step 1022). If the combine master swath has not changed, a V2V active swath command message is sent to the V2V tractor (step 1026) and the process ends. Alternatively, if the combine master swath has changed, text message box 46 can be updated to display "Wait for V2V setup," the V2V control button 44 displaying "V2V Disengage" is deactivated, the combine control setup control state is initiated and the control setup timer is reset (step 1028) and the process ends.

Figure 11:
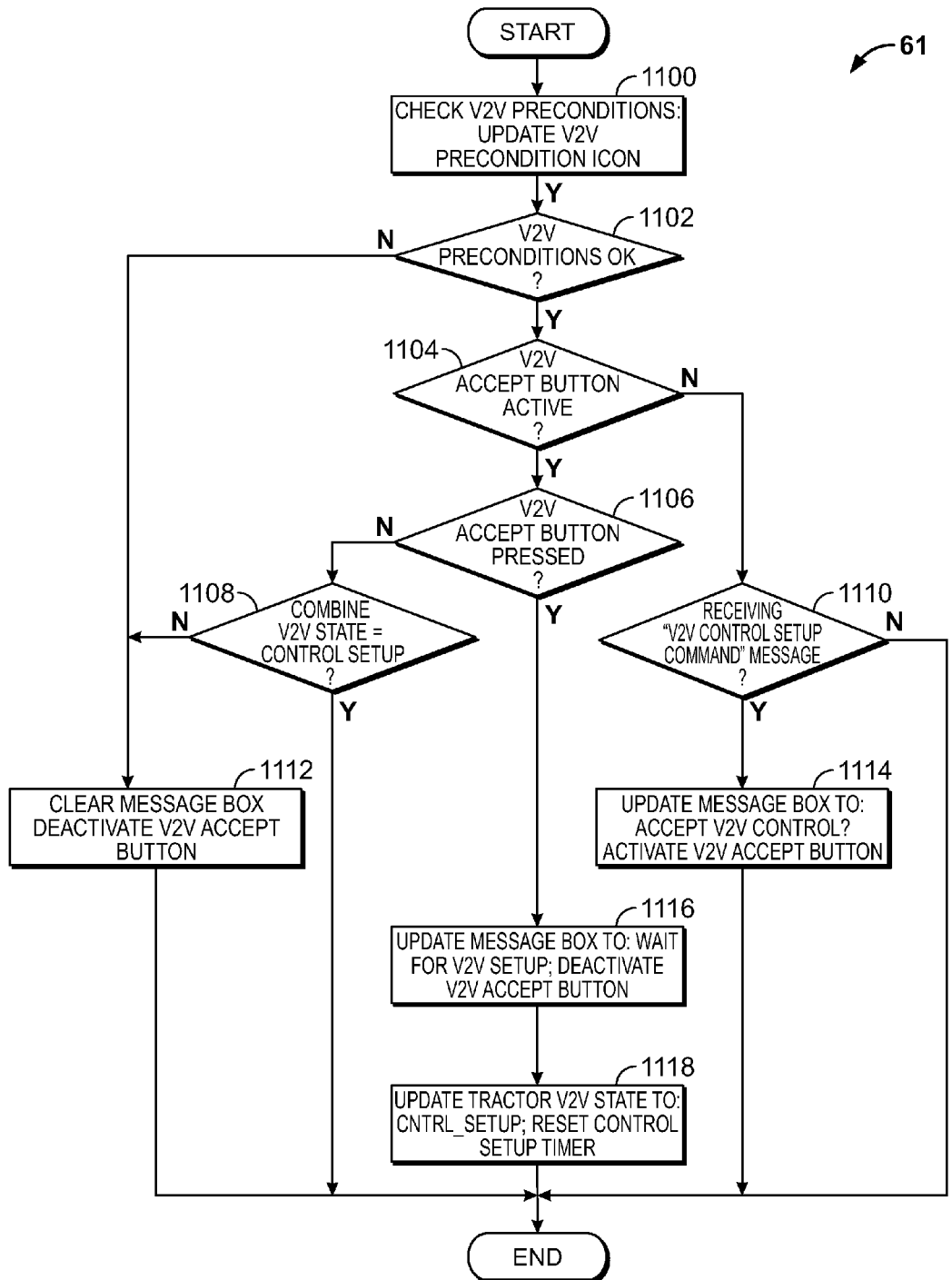
FIGS. 11-13 shows flow charts of embodiments of the control processes for the control system of FIG. 6B.

FIG. 11 shows a control process for the tractor idle control state from FIG. 6B. The tractor idle control state 61 can receive information on GPS signal quality and the combine V2V heartbeat message as V2V preconditions, and can activate or deactivate the multi-function V2V control button 45 based on that information or based on the operator control input on the V2V control button 45.

The process begins by checking for information on V2V precondition parameters, e.g., GPS signal quality and combine V2V heartbeat message, to see if the necessary V2V preconditions are satisfied to permit V2V operation, and updating a V2V icon of the V2V tractor user interface 41 (step 1100). The V2V icon (not shown in FIG. 4B) can be, but is not limited to, a box with a "V2V" text in it and with green background when the necessary V2V preconditions are satisfied, and the V2V icon can be a box with an "X" overlaying the V2V text and with red background when the necessary V2V preconditions are not satisfied. Next, a process decision is made based on if the necessary V2V preconditions are satisfied to permit V2V operation (step 1102). If the V2V preconditions are not satisfied, the text message box 47 is cleared and the V2V control button 45 displaying "V2V Accept" is deactivated (step 1112) and the process ends. Alternatively, if the V2V preconditions are satisfied, a determination is made on whether the V2V control button 45 is active and displaying "V2V Accept" (step 1104). If the V2V control button 45 displaying "V2V Accept" is not active, a determination is made on whether the V2V control setup command message has been received from the V2V combine (step 1110). If the V2V control setup command message has not been received, the process ends. Alternatively, if the V2V control setup command message has been received, the text box 47 is updated to display "Accept V2V control" and the V2V control button 45 is activated and displays "V2V Accept" (step 1114) and the process ends. If the V2V control button 45 displaying "V2V Accept" is active, a determination is made on whether the V2V control button 45 displaying "V2V Accept" has been pressed or selected (step 1106). If the V2V control button 45 has not been pressed or selected, a determination is made on whether the V2V combine is in the combine control setup control state (step 1108). If the V2V combine is in the combine control setup control state, the process ends. Alternatively, if V2V combine is not in the combine control setup control state, the text message box 47 is cleared and the V2V control button 45 is deactivated (step 1112) and the process ends. If the V2V control button 45 has been pressed or selected, the text message box 47 is updated to display "Wait for V2V setup" and the V2V control button 45 displaying "V2V Accept" is deactivated (step 1116). Next, the tractor control setup control state is initiated and the V2V control setup timer is reset (step 1118) and the process ends.

Figure 12:
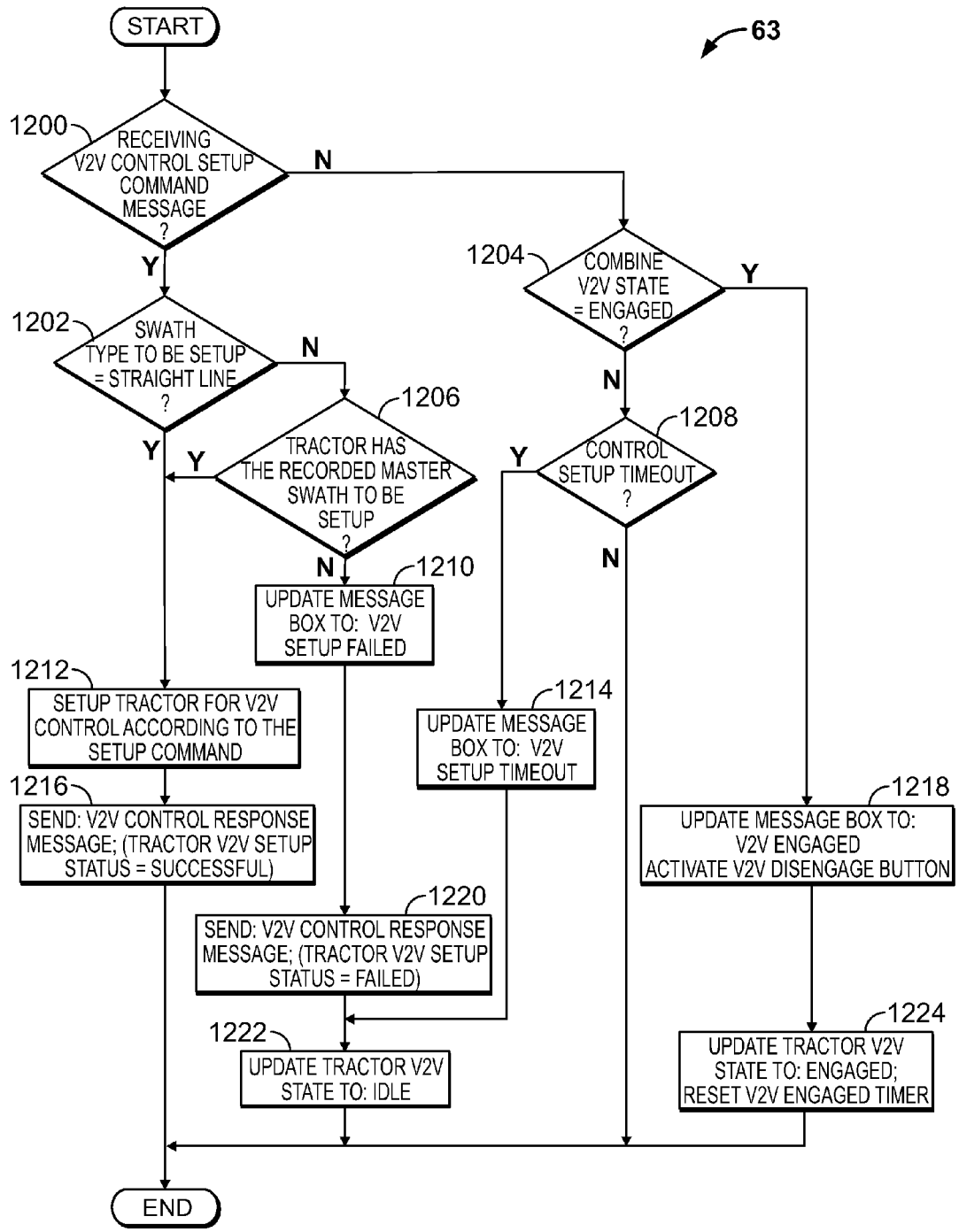

FIG. 12 shows a control process for the tractor control setup control state from FIG. 6B. For the tractor control setup control state 63, a V2V control setup timer is reset at the end of the tractor idle control state and the V2V control setup timeout can be set at a certain time value, such as 15 seconds.

The process for the tractor control setup control state begins by determining whether a V2V control setup command message has been received from the V2V combine (step 1200). If the V2V control setup command message has not been received, a determination is made on whether the V2V combine is in a combine engaged control state (step 1204). If the V2V combine is in a combine engaged control state, the text message box 47 is updated to display "V2V engaged" and the V2V control button 45 is activated and displays "V2V Disengage" (step 1218). Next, the tractor engaged control state is initiated and the V2V engaged timer is reset (step 1224) and the process ends. Alternatively, if the V2V combine is not in a combine engaged control state, a determination is made on whether the V2V control setup timer has expired (step 1208). If the V2V control setup timer has not expired, the process ends. Alternatively, if the V2V control setup timer has expired, text message box 47 is updated to "V2V setup timeout" (step 1214) and the tractor idle control state is engaged (step 1222) and the process ends.

If the V2V control setup command message has been received, a determination is made on whether the swath type to be setup is a straight line (step 1202). If the swath type to be setup is not a straight line, a determination is made on whether the V2V tractor has the recorded master swath to be setup (step 1206). If the V2V tractor does not have the recorded master swath to be setup, the text message box 47 is updated to "V2V setup failed" (step 1210), a V2V control response message is sent to the V2V combine indicating that the V2V tractor setup status has failed (step 1220) and the tractor idle control state is initiated (step 1222) and the process ends. If the swath type to be setup is a straight line or if the V2V tractor has the recorded master swath to be setup, the V2V tractor is setup for V2V control based on the V2V control setup command (step 1212). Next, a V2V control response message is sent to the V2V combine indicating that the V2V tractor setup status is successful (step 1216) and the process ends. The tractor V2V control setup (step 1212) can include a determination of a tractor adjusted swath and, if necessary, a determination of a tractor transition trajectory.

Figure 13:
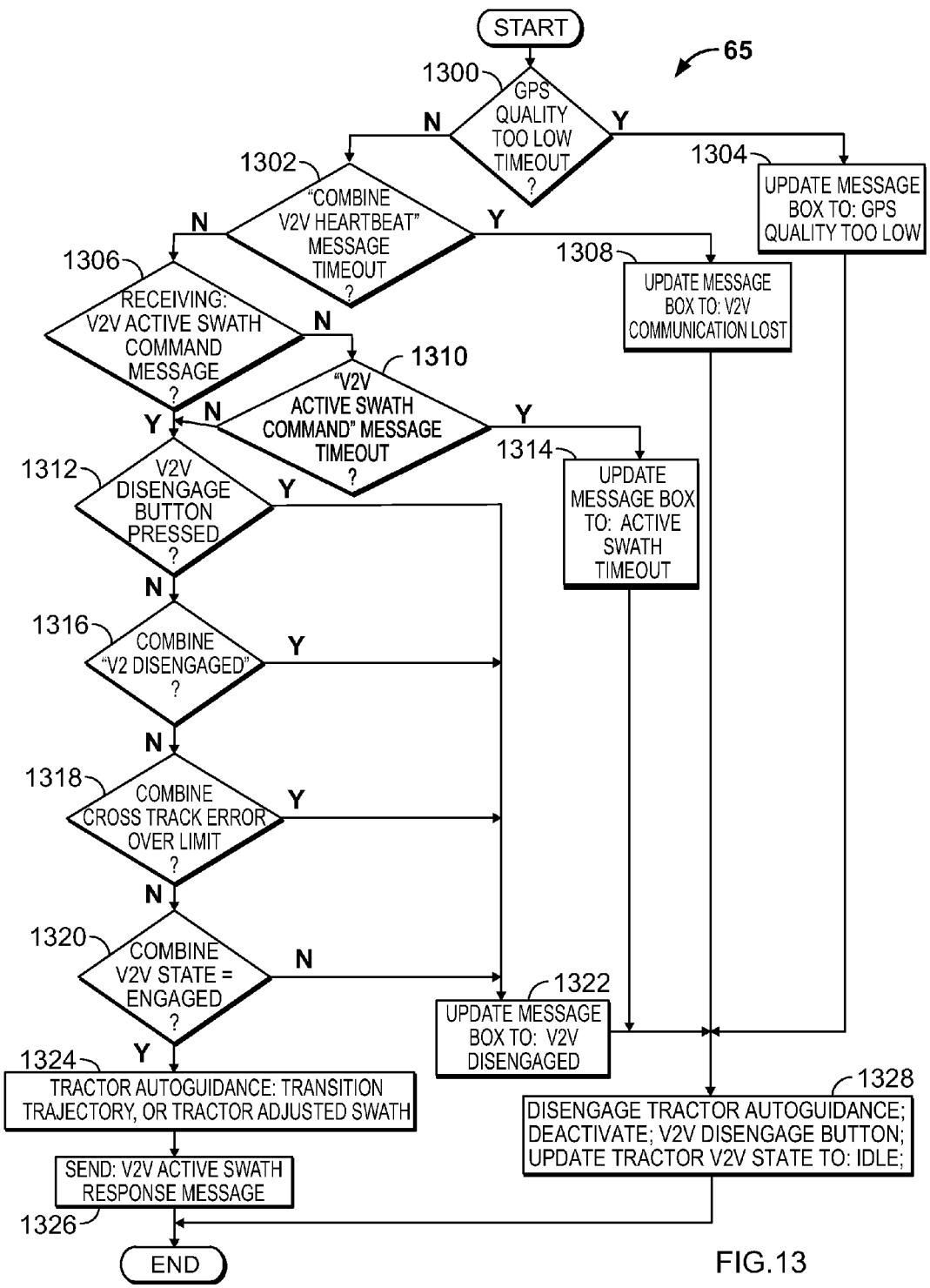

FIG. 13 shows a control process for the tractor engaged control state from FIG. 6B. In the tractor engaged control state 65, a V2V engaged timer is reset at the end of the tractor control setup control state. Additionally, the GPS quality too low timeout, the heartbeat message timeout and the V2V active swath command message timeout can each be set at the same time value as the V2V engaged timer, e.g., 1 second, or they can be individually assigned different time values. In addition, for the tractor engaged control state 65, the GPS quality must be at least Omnistar HP/XP (+/−10 cm) or higher for V2V engage.

The process for the tractor engaged control state begins by determining whether the GPS quality too low timeout has expired (step 1300). If the GPS quality too low timeout has expired, the text message box 47 is updated to display "GPS quality too low" (step 1304), the V2V control button 45 displaying "V2V Disengage" is deactivated, the V2V tractor autoguidance system is disengaged and the tractor idle control state is initiated (step 1328) and the process ends. Alternatively, if the GPS quality too low timeout has not expired, a determination is made on whether the combine V2V heartbeat message timeout has expired (step 1302). If the combine V2V heartbeat message timeout has expired, the text message box 47 is updated to display "V2V communication lost" (step 1308), the V2V control button 45 displaying "V2V Disengage" is deactivated, the V2V tractor autoguidance system is disengaged and the tractor idle control state is initiated (step 1328) and the process ends. Alternatively, if the combine V2V heartbeat message timeout has not expired, a determination is made on whether the V2V active swath command message has been received from the V2V combine (step 1306).

If the V2V active swath command message has not been received, a determination is made on whether the V2V active swath command message timeout has expired (step 1310). If the V2V active swath response message timeout has expired, the text message box 47 is updated to display "Active swath timeout" (step 1314), the V2V control button 45 displaying "V2V Disengage" is deactivated, the V2V tractor autoguidance system is disengaged and the tractor idle control state is initiated (step 1328) and the process ends. Alternatively, if the V2V active swath command message timeout has not expired or if the V2V active swath command message has been received, a determination is made on whether the V2V control button 45 displaying "V2V Disengage" has been pressed or selected (step 1312).

If the V2V control button 45 displaying "V2V Disengage" has been pressed or selected, the text message box 47 is updated to display "V2V Disengaged" (step 1322), the V2V control button 45 displaying "V2V Disengage" is deactivated, the V2V tractor autoguidance system is disengaged and the tractor idle control state is initiated (step 1328) and the process ends. Alternatively, if the V2V control button 45 displaying "V2V Disengage" has not been pressed or selected, a determination is made on whether "V2V Disengage" has been selected at the V2V combine (step 1316). If "V2V Disengage" has been selected at the V2V combine, the text message box 47 is updated to display "V2V Disengaged" (step 1322), the V2V control button 45 displaying "V2V Disengage" is deactivated, the V2V tractor autoguidance system is disengaged and the tractor idle control state is initiated (step 1328) and the process ends.

Alternatively, if "V2V Disengage" has not been selected at the V2V combine, a determination is made on whether the V2V combine cross track error is over a predefined limit (step 1318). If the V2V combine cross track error is not over a predefined limit, a determination is made on whether the V2V combine is in the combine engaged control state (step 1320). If the V2V combine is not in the combine engaged control state or the V2V combine cross track error is over a predefined limit, the text message box 47 is updated to display "V2V Disengaged" (step 1322), the V2V control button 45 displaying "V2V Disengage" is deactivated, the V2V tractor autoguidance system is disengaged and the tractor idle control state is initiated (step 1328) and the process ends. If the V2V combine is in the combine engaged control state, a V2V tractor autoguidance control is engaged or remains engaged to follow a V2V tractor transition trajectory if the tractor is far from the combine or to follow a V2V adjusted swath (step 1324). Next, a V2V active swath response message is sent to the V2V combine (step 1326) and the process ends.

In one embodiment, messages displayed in the text message box 46 during the processes of FIGS. 8-10 may additionally or alternatively be displayed in text message box 42. In another embodiment, messages displayed in the text message box 47 during the processes of FIGS. 11-13 may additionally or alternatively be displayed in the text message box 43.

Figure 14A:
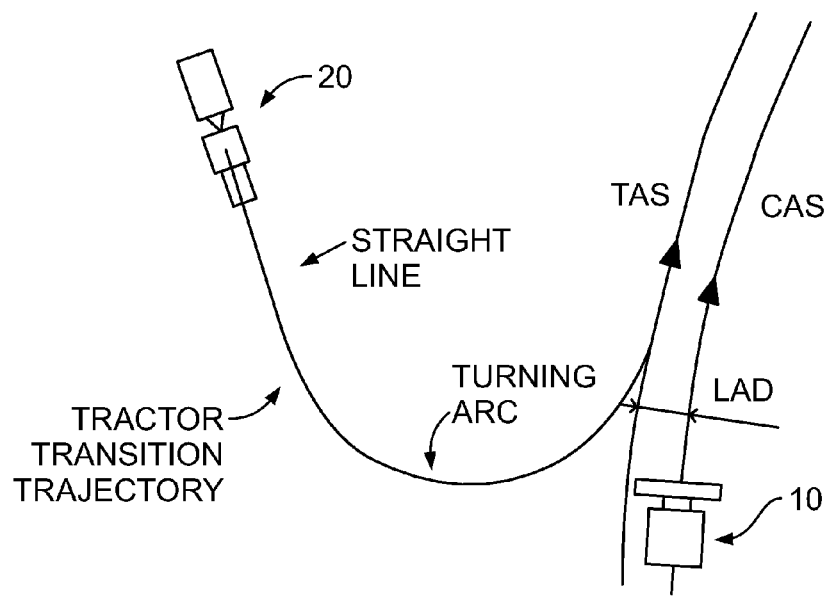
FIGS. 14A and 14B show different V2V tractor transition trajectories under V2V autoguidance control.
Figure 14B:
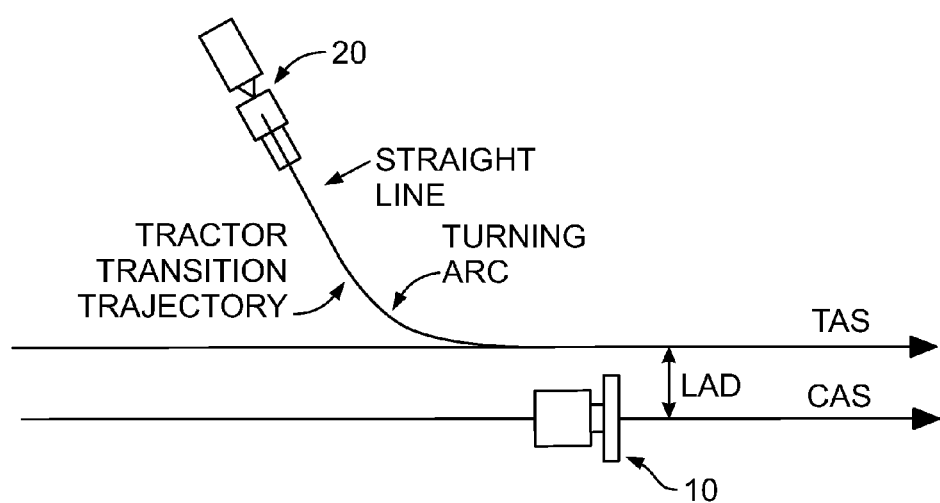

FIGS. 14A and 14B show different V2V tractor transition trajectories under V2V autoguidance control. At the time of V2V autoguidance control engagement, if the V2V tractor is too far away from the V2V combine or a heading difference between the V2V combine and V2V tractor is more than about 90 degrees, a tractor transition trajectory can be used to guide the V2V tractor towards a proper position and heading (or direction) for autoguidance of the V2V tractor into the tractor adjusted swath. A tractor transition trajectory is generated and coordinates of the trajectory waypoints are sent to the V2V tractor navigation controller. The V2V tractor navigation controller can then automatically steer the V2V tractor on the tractor transition trajectory towards the tractor adjusted swath. The tractor transition trajectory can be time dependent which includes a time variable, or time independent.

The generation of the tractor transition trajectory takes into consideration the tractor adjusted swath (TAS), the V2V combine's position, heading and speed, the V2V tractor's position, heading and speed, and minimum turning radius of the V2V tractor. In one embodiment, the V2V tractor approaching the V2V combine on the transition trajectory can be operated at a greater rate of speed than the V2V combine. A tractor transition trajectory can be, but is not limited to, a straight line plus an arc. The straight line can be aligned with a current tractor heading. The arc can be tangent both to that straight line and the TAS, and have a radius that is larger than the minimum turn radius of the V2V tractor. Once a radius of the arc is selected, such as a radius that is 20% larger than the minimum turn radius, the tractor transition trajectory can be simply computed in the case of a straight TAS, as shown in FIG. 14B.

In the case of a curved TAS as shown in FIG. 14A, a straight line approximation to a section of the curved TAS can be used as a linearized TAS section for the transition trajectory generation purpose. The linearized TAS section can be behind, next to, or ahead of the current V2V combine location. In one exemplary embodiment, to avoid a risk of equipment collision when the V2V tractor approaches the V2V combine, a linearized TAS section behind the combine can be used for transition trajectory generation purposes.

In an exemplary embodiment, the wireless communications between the V2V combine and the V2V tractor can be controller area network (CAN) messages. Some examples of CAN messages include: combine V2V heartbeat; tractor V2V heartbeat; V2V control setup command; V2V control setup response; V2V active swath command; V2V active swath response; and combine GPS position.

In another exemplary embodiment, the WCUs can include a manual power switch to control the power supply to the WCU and thereby enable/disable V2V control. An equipment operator can turn off the WCU using the switch if the operator doesn't anticipate a V2V operation during the day and doesn't want to receive any V2V related alerts and messages. A relay switch can be an alternative to the manual power switch. An operator presses an enable/disenable button on the display unit and an electronic controller adjusts the relay switch on/off position in response to the operator input to turn on/off the WCU. In another embodiment, the TV2V unit can be a tractor longitudinal position controller.

In one exemplary embodiment, the heartbeat messages from the V2V combine and the V2V tractor can include information on V2V autoguidance control system operational status including V2V state, GPS quality, steering mode, etc.

In one exemplary embodiment, the buzzer can generate an audible sound, such as a beep every time the wireless communication status changes or the unload condition changes. The buzzer can be included inside the corresponding display unit.

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In the further consideration of the drawings of this application and the discussion of such drawings and the elements shown therein, it should also be understood and appreciated that, for purposes of clarity in the drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already be widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method for controlling a transport vehicle to bring the transport vehicle into alignment with a harvester for unload on the go operation, the method comprising:
   determining a position for the transport vehicle;
   determining an active swath for the harvester;
   calculating an adjusted swath for the transport vehicle based on the active swath for the harvester;
   calculating a trajectory for the transport vehicle to travel from the determined position of the transport vehicle to the adjusted swath, the trajectory including a straight line component and an arc component, the arc component being tangent to both the straight line component and the adjusted swath; and
   controlling the transport vehicle to follow the calculated trajectory with commands from a controller;
   wherein calculating a trajectory for the transport vehicle includes calculating a radius for the arc component, the calculated radius for the arc component being greater than a minimum turning radius for the transport vehicle.

2. The method of claim 1 wherein the calculated radius for the arc component is at least 20% greater than the minimum turning radius for the transport vehicle.

3. The method of claim 1 wherein calculating a trajectory for the transport vehicle includes aligning the straight line component with a heading for the transport vehicle.

4. The method of claim 1 further comprising initiating unload on the go operation between the transport vehicle and the harvester in response to the transport vehicle following the calculated trajectory and travelling on the adjusted swath.

5. The method of claim 4 wherein the adjusted swath is substantially parallel to the active swath.

6. A method for controlling a transport vehicle to bring the transport vehicle into alignment with a harvester for unload on the go operation, the method comprising:
   determining a position for the transport vehicle;
   determining an active swath for the harvester;
   calculating an adjusted swath for the transport vehicle based on the active swath for the harvester;
   calculating a trajectory for the transport vehicle to travel from the determined position of the transport vehicle to the adjusted swath, the trajectory including a straight line component and an arc component, the arc component being tangent to both the straight line component and the adjusted swath;
   controlling the transport vehicle to follow the calculated trajectory with commands from a controller: and
   wherein calculating a trajectory for the transport vehicle includes determining a straight line approximation to a section of the adjusted swath, the arc component being tangent to the straight line approximation.

7. The method of claim 6 wherein the straight line approximation is located behind a current position of the harvester.

8. A method for controlling a transport vehicle to bring the transport vehicle into alignment with a harvester for unload on the go operation, the method comprising:
   determining a position for the transport vehicle;
   determining an active swath for the harvester;
   calculating an adjusted swath for the transport vehicle based on the active swath for the harvester;
   calculating a trajectory for the transport vehicle to travel from the determined position of the trans ort vehicle to the adjusted swath the trajectory including a straight line component and an arc component, the arc component being tangent to both the straight line component and the adjusted swath;
   controlling the transport vehicle to follow the calculated trajectory with commands from a controller; and
   transmitting the active swath to the transport vehicle in a message from the harvester.

9. A method for controlling a transport vehicle to bring the transport vehicle into alignment with a harvester for unload on the co operation, the method comprising:
   determining a position for the transport vehicle;
   determining an active swath for the harvester;
   calculating an adjusted swath for the transport vehicle based on the active swath for the harvester;
   calculating a trajectory for the transport vehicle to travel from the determined position of the transport vehicle to the adjusted swath, the trajectory including a straight line component and an arc component, the arc component being tangent to both the straight line component and the adjusted swath;
   controlling the transport vehicle to follow the calculated trajectory with commands from a controller; and
   determining whether the transport vehicle and harvester are within wireless communication range and wherein determining a position for the transport vehicle, determining an active swath for the harvester, calculating an adjusted swath for the transport vehicle, calculating a trajectory for the transport vehicle and controlling the transport vehicle to follow the calculated trajectory are executed in response to the transport vehicle and harvester being within wireless communication range.

10. A control system to synchronize control of a harvester and a transport vehicle, the control system comprising:
    a harvester control system comprising:
    a first global positioning system device to determine a position of a harvester;
    a first controller to control operation of the harvester the first controller comprising a first microprocessor to execute a computer program to determine an active swath for the harvester using the position of the harvester from the first global positioning system device and using information relating to a recorded master swath and a harvester swath width; and
    a first communication device:
    a transport vehicle control system comprising:
    a second global positioning system device to determine a position of a transport vehicle;
    a second controller to control operation of the transport vehicle, the second controller comprising a second microprocessor to execute a computer program to determine an adjusted swath for the transport vehicle based on the active swath; and a second communication device, the second communication device being configured and positioned to wirelessly exchange information with the first communication device;

the second controller calculates a trajectory for the transport vehicle based on the position of the transport vehicle from the second global positioning system device, the determined adjusted swath and the first communication device and the second communication device being within wireless communication range with a computer program executed by the second microprocessor; and the second controller transmits a control signal to control the transport vehicle to follow the calculated trajectory with a computer program executed by the second microprocessor;

wherein the calculated trajectory includes a straight line component and an arc component, the arc component being tangent to both the straight line component and the adjusted swath.

11. The control system of claim 10 wherein the arc component has a radius, the radius of the arc component being greater than a minimum turning radius for the transport vehicle.

12. The control system of claim 11 wherein the radius for the arc component is at least 20% greater than the turning radius for the transport vehicle.

13. The control system of claim 10 wherein the straight line component is aligned with a heading for the transport vehicle.

14. A control system to synchronize control of a harvester and a transport vehicle, the control system comprising:

a harvester control system comprising:

a first global positioning system device to determine a position of a harvester;

a first controller to control operation of the harvester, the first controller comprising a first microprocessor to execute a computer program to determine an active swath for the harvester using the position of the harvester from the first global positioning system device and using information relating to a recorded master swath and a harvester swath width; and a first communication device;

a transport vehicle control system comprising:

a second global positioning system device to determine a position of a transport vehicle;

a second controller to control operation of the transport vehicle, the second controller comprising a second microprocessor to execute a computer program to determine an adjusted swath for the transport vehicle based on the active swath; and a second communication device, the second communication device being configured and positioned to wirelessly exchange information with the first communication device;

the second controller calculates a trajectory for the transport vehicle based on the position of the transport vehicle from the second global positioning system device, the determined adjusted swath and the first communication device and the second communication device being within wireless communication range with a computer program executed by the second microprocessor; and the second controller transmits a control signal to control the transport vehicle to follow the calculated trajectory with a computer program executed by the second microprocessor; and wherein the harvester control system sends a control setup command message to the transport vehicle control system using the first communication device, the control setup command message includes information on at least one of a master swath, a swath type an active swath a swath width, a harvester header offset, or an unload tube position offset.

15. The control system of claim 14 wherein the first communication device and the second communication device communicate between a controller area network of the harvester and a controller area network of the transport vehicle.

16. The control system of claim 14 wherein the first controller and the second controller each include a user interface.

17. The control system of claim 16 wherein each user interface includes a message box to display messages and a control button to initiate actions by the corresponding controller.

18. The control system of claim 14 wherein the transport vehicle and harvester are in wireless communication range upon exchange of heartbeat messages by the transport vehicle control system and harvester control system.

19. The control system of claim 14 wherein the adjusted swath is substantially parallel to the active swath.

* * * * *